C. A. SWITZER.
VEHICLE SIGNAL.
APPLICATION FILED APR. 7, 1913.
1,137,364. Patented Apr. 27, 1915.
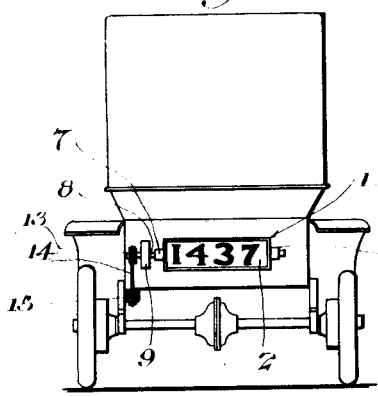
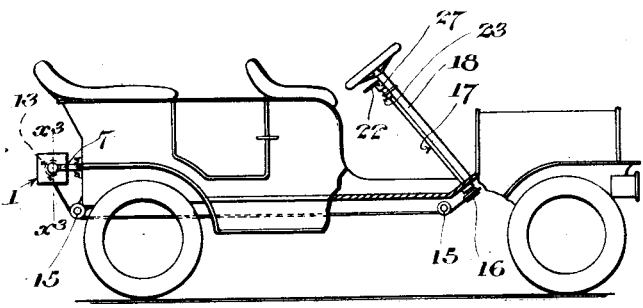
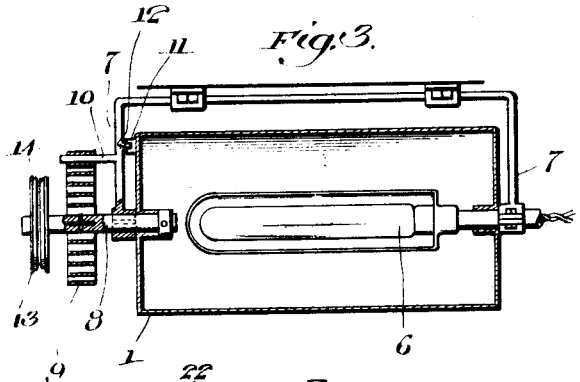
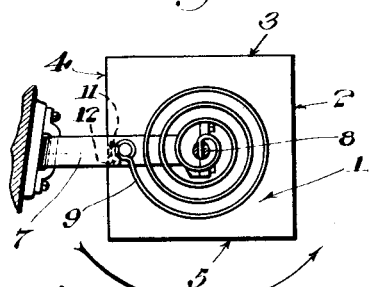
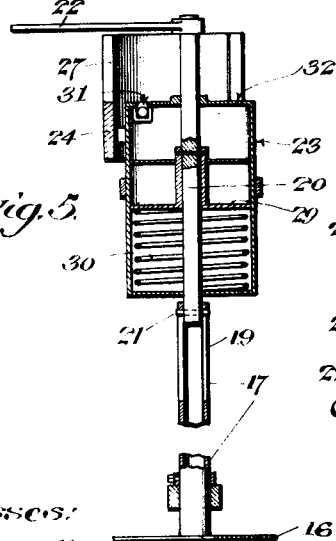
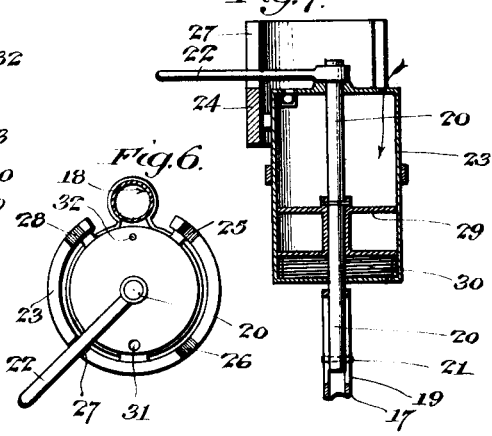
Inventor:
Charles A. Switzer

UNITED STATES PATENT OFFICE.

CHARLES A. SWITZER, OF PASADENA, CALIFORNIA, ASSIGNOR, BY DIRECT AND MESNE ASSIGNMENTS, TO SAFETY AUTO SIGNAL COMPANY, OF LOS ANGELES, CALIFORNIA.

VEHICLE-SIGNAL.

1,137,364.     Specification of Letters Patent.     Patented Apr. 27, 1915.

Application filed April 7, 1913. Serial No. 759,534.

*To all whom it may concern:*

Be it known that I, CHARLES A. SWITZER, a citizen of the United States, residing at Pasadena, in the county of Los Angeles and State of California, have invented a new and useful Vehicle-Signal, of which the following is a specification.

This invention relates to vehicle signals for indicating the direction the vehicle is about to take or to indicate whether it is about to stop, and has for its object to produce a simple device of compact structure, mechanically operated.

A further object is to provide for the automatic restoration of the signal to normal condition after it has been operated, thereby relieving the driver of the necessity of restoring the signal after he has turned a corner. Where signals require to be restored this is often neglected and the signal falsely indicates, which is obviated in the present invention.

Referring to the drawings: Figure 1 is a rear elevation of the automobile equipped with the device. Fig. 2 is a side elevation of the automobile with a part broken away. Fig. 3 is an enlarged vertical section on line $x^3$—$x^3$, Fig. 2. Fig. 4 is an end elevation of what is shown in Fig. 3. Fig. 5 is a sectional view through the controlling box. Fig. 6 is a plan view of the controlling box. Fig. 7 is a view similar to Fig. 5, showing the follower extended.

The signal comprises a box 1 having four sides 2, 3, 4 and 5, which respectively carry the signs " Number ", " Left ", " Stop " and " Right ". This box is preferably hollow with transparent sides and with an electric light 6 inside, to illuminate the signal in the dark. The box is rotatably supported in a bracket 7 which may be secured at any convenient point, as for example, the back of the automobile, as shown in Figs. 1 and 2. A shaft 8 extends from one end of the box 1 and attached thereto is a coil spring 9, the outer end of spring 9 being secured to an arm 10 on the bracket 7. A stop 11 projects from the box and is adapted to strike a pin 12 on the frame 7 to hold the box in normal position, the spring 9 acting to turn the box in the opposite direction of the arrow, Fig. 4, and hold stop 11 against the pin 12, as shown in Fig. 8 of the drawing.

Carried by the shaft 8 is a pulley 13 on which is wound a cable 14 which extends over suitable idlers 15 to another pulley 16 on the lower end of a tubular sleeve 17 which extends along the steering post 18. As shown in Fig. 5, the tubular sleeve 17 is slotted at 19 and receives a shaft 20 having a pin 21 which lies in slot 19. At the upper end of shaft 20 is a handle 22. Secured to the steering post 18 is a drum 23 which supports a sector 24 having slots 25, 26, 27 and 28, either of which is adapted to receive the handle 22 when the latter is pushed down. Within the drum 23 is a follower 29 which is secured to the shaft 20 and a spring 30 below the follower 29 serves to hold the same in elevated position as shown in Fig. 5. In one end of the drum 23 is an inlet check valve 31 which permits the ready inflow of air into the drum. In the same end the drum also has a small orifice 32 through which air is expelled, the valve 31 preventing air from passing out at the check valve.

In operation the handle 22 will stand in a position normally holding the box 1 so that it displays the face 2 of the box which contains the number of the automobile. When the driver wishes to turn to the right, he turns handle 22 into position in register with one of the notches in sector 24 which corresponds with the sign containing the word " Right " thereby turning shaft 20 and through the medium of pulleys 13 and 16, turning the box 1 so that the sign " Right " is displayed, and as soon as the lever 22 is in register with the slot, he depresses the lever into the slot, forcing the follower 29 toward the bottom of the drum 23. Upon releasing the handle 22, the air which is within the upper part of the drum prevents the rapid return of the follower, so that the latter moves up slowly propelled by spring 30 at a rate proportioned to the rate of escape of air through the exhaust port 32, with the result that the sign is displayed sufficiently long to enable the driver to turn the corner. As soon as the spring 30 has elevated the shaft 20 to normal position and disengaged arm 32 from its slot, the spring 9 acts to turn the box back to its normal position. Similarly, in turning to the left or to stop, the driver turns the lever 22 into the appropriate notch, displaces it and then the device automatically restores to normal position after a brief time.

What I claim is:

1. A vehicle signal comprising a signal displaying element, means for moving said displaying element to display a signal, means for automatically maintaining said signal stationary in displaying position for a definite period of time, a spring for restoring said signal displaying element to normal position after it has been so displayed, and means for arresting the restoring action of said spring when said element reaches its normal position.

2. A revolving signal displaying element provided with a plurality of signals, means for revolving said element to display any of said signals, means for automatically maintaining said signal stationary in any displaying position for a definite period of time, a spring for restoring said signal displaying element to normal position after it has been so displayed, and means for arresting the restoring action of said spring when said element reaches its normal position.

3. A rotatable signal displaying element having a plurality of signal displaying surfaces, means for rotating said element to display any of said surfaces, a drum, a follower in said drum, said follower being actuated in one direction by said rotating means, means for locking the signal element against rotation when the follower is so actuated, means for automatically moving the follower in the other direction back to its initial position to release said signal element, said drum provided with an air inlet for admitting air into the interior of said drum, and an air outlet of less area than the inlet to restrict the escape of air from the drum and to retard the return movement of the follower to its initial position to maintain the displaying element in displaying position for a definite period of time, and means for returning said signal element to its normal non-displaying position when released from said locking means by said follower in its initial position.

4. A rotatable signal, a displaying element having a plurality of signal displaying surfaces, spring means for holding said element in a definite normal position, a shaft on said element, a reel on said shaft, a connection wound on said reel, a drum, a follower in said drum, a spring below the follower, air inlet means in said drum, said drum having an exhaust port of less capacity than the inlet means, an operating shaft slidable and rotatable in said drum carrying said follower, a pulley carried by said operating shaft, said connection being wound on said latter pulley, an arm for operating said operating shaft, and a sector with notches adapted to receive the operating arm and allow the same to slide the operating shaft longitudinally to operate the follower.

5. A rotatable signal, a displaying element having a plurality of signal displaying surfaces, spring means for holding said element in a definite normal position, a shaft on said element, a reel on said shaft, a connection wound on said reel, a drum, a follower in said drum, a spring below the follower, air inlet means in said drum, said drum having an exhaust port of less capacity than the inlet means, an operating shaft slidable and rotatable in said drum carrying said follower, a pulley carried by said operating shaft, said connection being wound on said latter pulley, an arm for operating said operating shaft, a sector with notches adapted to receive the operating arm and allow the same to slide the operating shaft longitudinally to operate the follower, a sleeve supporting said latter pulley, means revolubly supporting said sleeve, said sleeve being longitudinally slotted, and a pin in said operating shaft engaging the slotted sleeve.

6. A revolving signal displaying element provided with a plurality of signals, a pulley in axial alinement with said signal displaying element and adapted to rotate therewith, a second pulley, a connecting element extending around said pulleys to cause them to rotate in synchronism with each other, a handle adapted to rotate said second pulley and said signal displaying element through the medium of said connecting element and said pulleys, to display a signal, and means for automatically restoring said element to normal position after a definite period of time.

7. A device of the character described comprising a signal displaying element, means for actuating said element to display a signal, means for temporarily maintaining said signal in displaying position, a drum, a follower in said drum, means for moving said follower in one direction upon the display of a signal, an air inlet in said drum to admit air therein when the follower is so moved, means for moving the follower in the other direction when the signal has been displayed to release the signal element from said temporary display maintaining means, an air outlet in said drum, smaller in dimensions than said inlet, to retard the escape of air from the drum and the releasing movement of said follower, whereby the signal is displayed for a definite interval, and means for returning the signal displaying element to its normal position.

8. A vehicle signal comprising a signaling member movably mounted on the vehicle, means on the vehicle for moving said signal to any one of several indicating positions, means for retaining the selected signal in view for a definite interval, and means operating after said interval for automatically restoring the selected signal quickly without appreciably displaying the other signals.

In testimony whereof I have hereunto set my hand at Los Angeles, California, this 31st day of March, 1913.

CHARLES A. SWITZER.

In presence of—
G. T. HACKLEY,
MARTHA M. LANGE.